United States Patent [19]

Albright et al.

[11] 4,408,672

[45] Oct. 11, 1983

[54] LATCH MECHANISM FOR A SKID-STEER LOADER WITH A ROLL OVER PROTECTIVE STRUCTURE HAVING A TILT-BACK CAPABILITY

[75] Inventors: Larry E. Albright; Lonnie D. Hoechst, both of Gwinner, N. Dak.

[73] Assignee: Clark Equipment Company, Buchanan, Mich.

[21] Appl. No.: 228,646

[22] Filed: Jan. 26, 1981

[51] Int. Cl.³ .............................................. B62D 27/04
[52] U.S. Cl. .............................. 180/89.14; 180/89.16; 296/190
[58] Field of Search ......................... 180/89.13–89.18; 296/190

[56] References Cited

U.S. PATENT DOCUMENTS

| | | | |
|---|---|---|---|
| 3,039,557 | 6/1962 | Boyce et al. | 180/89.14 |
| 3,797,883 | 3/1974 | Steiner et al. | 180/89.15 |
| 3,958,659 | 5/1976 | Selman | 180/89.15 |

Primary Examiner—Robert R. Song
Attorney, Agent, or Firm—Harry G. Thibault

[57] ABSTRACT

The Roll Over Protective Structure (ROPS) or cab enclosure of a skid-steer loader has been modified and a latch mechanism has been added to the loader to facilitate servicing of the loader. The Roll Over Protective Structure (ROPS) or cab enclosure is now positively biased at its rear pivot point away from the frame by means of a torsion spring mounted between the cab and the roll over protective structure. In addition a latch mechanism for the cab enclosure is provided, the latch mechanism comprising a cam member fixedly mounted on the frame and a latch member fixedly mounted on the cab enclosure. The latch member is positively biased toward the cam surface of the cam member and slides along the cam member as the cab enclosure is rotated away from the frame. At the end of its travel the latch bar slides into a notch provided on the cam member that positively retains the cab enclosure in a full tilt-back position while the loader is being serviced.

4 Claims, 7 Drawing Figures

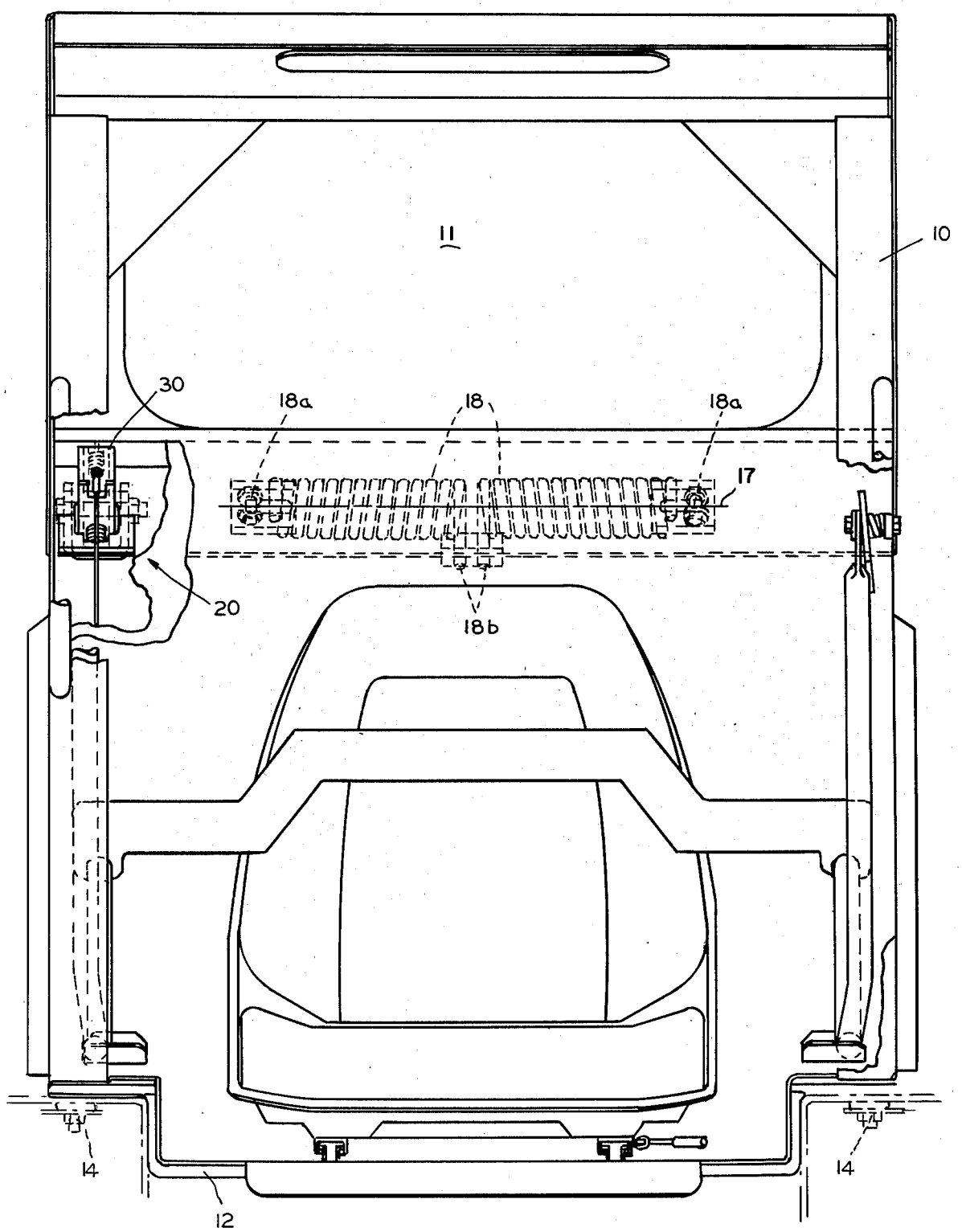

LATCH MECHANISM FOR A SKID-STEER LOADER WITH A ROLL OVER PROTECTIVE STRUCTURE HAVING A TILT-BACK CAPABILITY

BACKGROUND OF THE INVENTION

1. Field of the Invention

The present invention pertains to a latch mechanism used in conjunction with the Roll Over Protective Structure (ROPS) or cab enclosure of a skid-steer loader, the cab enclosure having tilt-back capabilities.

2. Description of the Prior Art

While in several of the earlier models, the Bobcat skid-steer loader was designed so that the cab enclosure which is secured to the frame could be detached from the frame at the front end and pivoted at the rear to provide the service technician with better access to the components contained within the interior of the frame of the structure, certain improvements and modifications have been made in the present structure to permit better ease of handling and to assure greater integrity of the cab enclosure in the tip-up position.

Specifically, the cab enclosure has been provided with a torsion spring mounted between the frame and the cab enclosure at the rear end of the vehicle. The torsion spring biases the cab enclosure toward a position rotatable away from the frame and therefore the torsion spring assists the service technician when he releases the front end of the cab enclosure so that he can rotate the cab enclosure up and away from the frame for access to the vehicle components within the interior of the frame. Furthermore, an improved latch mechanism retains the cab enclosure in its fully rearwardly rotated position and positive locks it in place so that the service technician is prevented from inadvertently jarring the cab enclosure loose as he works on the vehicle.

Thus, it is an object of the present invention to provide an improved latch mechanism for positively retaining the cab enclosure in a fully upright position for ease of servicing of the vehicle as well as to provide biasing means to assist the operator in swinging the cab enclosure away from the frame before he services the vehicle.

SUMMARY OF THE INVENTION

In the preferred embodiment of the present invention the Roll Over Protective Structure (ROPS) or cab enclosure is pivotally mounted to the vehicle at the rear, the pivotal mounting means including a torsion spring which is biased toward a tilt-back position and the cab enclosure is bolted to the frame of the vehicle at the front. When the cab enclosure is unbolted from the vehicle at the front, the torsion spring serves as a mechanical assist for the technician rotating the cab enclosure backwards. In addition, positive locking means are provided to retain the cab enclosure in a fully tilt-back position while the operator works on it.

The latch mechanism associated with the cab enclosure comprises a cam member fixedly mounted on the frame and a latch member fixedly positioned on the ROPS. Further, the latch member is slidable in a reciprocable manner and normally biased by a biasing means towards the cam member to engage a smooth cam surface on the cam member which terminates in a notch. As the ROPS or cab enclosure is rotated rearwardly away from the frame of the vehicle the latch member slides against the cam surface of the cam member until it reaches the notch in the cam member and then it slides into the notch to restrain the cab enclosure from forward movement. When the service technician has completed his work on the components contained within the frame, he may then engage a release which extracts the latch member from the notch in the cam member and permits the operator to rotate the cab enclosure forwardly to again engage the front end of the frame to be bolted down there for operation.

The present invention is set forth in detail below and should be considered with the accompanying drawings for a more complete understanding of the tip-up capability of the cab enclosure and the latch mechanism associated therewith. The accompanying drawings may be described as follows:

BRIEF DESCRIPTION OF THE DRAWINGS

FIG. 2 is a front elevational view of the cab enclosure portion shown in FIG. 1 with portions removed for clarity;

DETAILED DESCRIPTION OF THE PREFERRED EMBODIMENT

Figure 1:
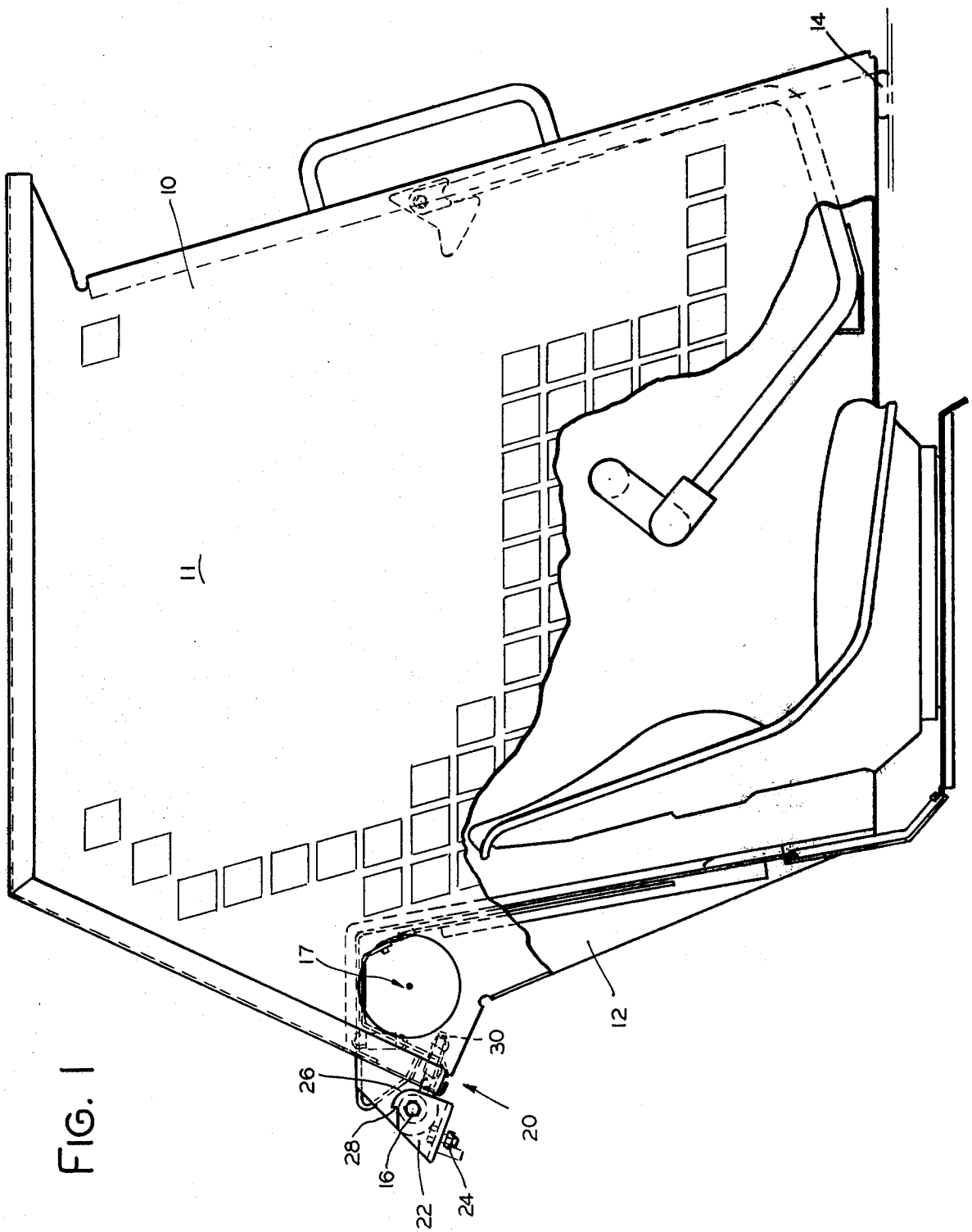
FIG. 1 is a side elevational view partly broken away of the cab enclosure or Roll Over Protective Structure (ROPS) of the skid-steer loader wherein the improved latch mechanism of the present invention is depicted.

FIG. 1 is a detailed view of the cab enclosure portion 10 of a skid-steer loader 11 such as the vehicle depicted in U.S. Pat. No. D 251,088 issued Feb. 13, 1979 and assigned to the Assignee of the present invention. Cab enclosure portion 10 provides a roll over protective capability for the skid-steer vehicle and may be alternatively referred to as a Roll Over Protective Structure (ROPS). The cab enclosure 10 is normally bolted to the frame 12 of the vehicle at the front as at locations 14 on opposite sides of the vehicle and at the rear of the vehicle the cab enclosure 10 is pivotally mounted in a well known manner about a common longitudinal axis 16. As shown in FIGS. 1 and 2, a pair of torsion springs 18 extend along an axis 17 parallel to the axis 16 and are cooperatively mounted between the cab enclosure 10 and the frame 12 of the vehicle to bias the cab enclosure 10 away from the frame 12 of the vehicle when the vehicle is released at the front mounting locations 14. Outer ends of the springs 18 are bolted to the cab enclosure as at 18a, and the inner ends of the springs 18 are bolted to the frame, as at 18b. A latch mechanism 20 provided at the rear of the cab enclosure 10 includes a cam member 22 fixedly mounted on the frame by bolts 24 and having a cam surface 26 arcuately shaped and terminating in an indentation or notch 28. The cab enclosure 10 pivots about the axis 16 of the cam member 22. Mounted on the cab enclosure is a latch plate 30 which cooperatively engages the member 22 as will be described further later.

Figure 3:
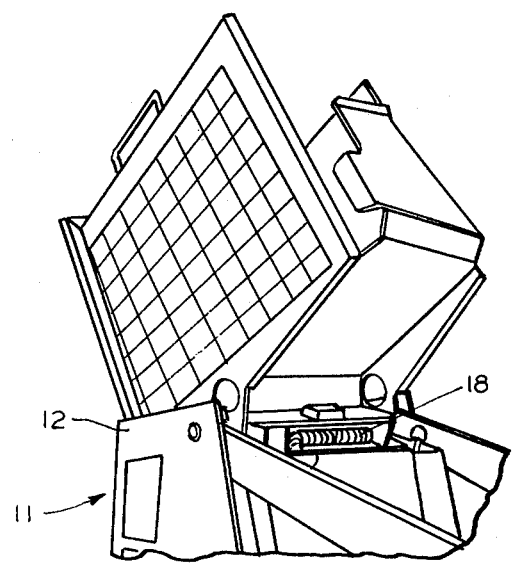
FIG. 3 is a perspective view of a skid-steer loader employing the present invention wherein the cab enclosure portion of the loader is in a tilt-back condition.

As can be seen in FIG. 2 the latch 20 is provided only on one side of the vehicle. FIG. 3 shows the cab enclosure 10 of the loader 11 tipped up and rotated rearwardly about its fixed rear pivot point to rotate the cab enclosure 10 away from the frame 12 and thereby provide access to components mounted within the frame 12.

Figure 4:
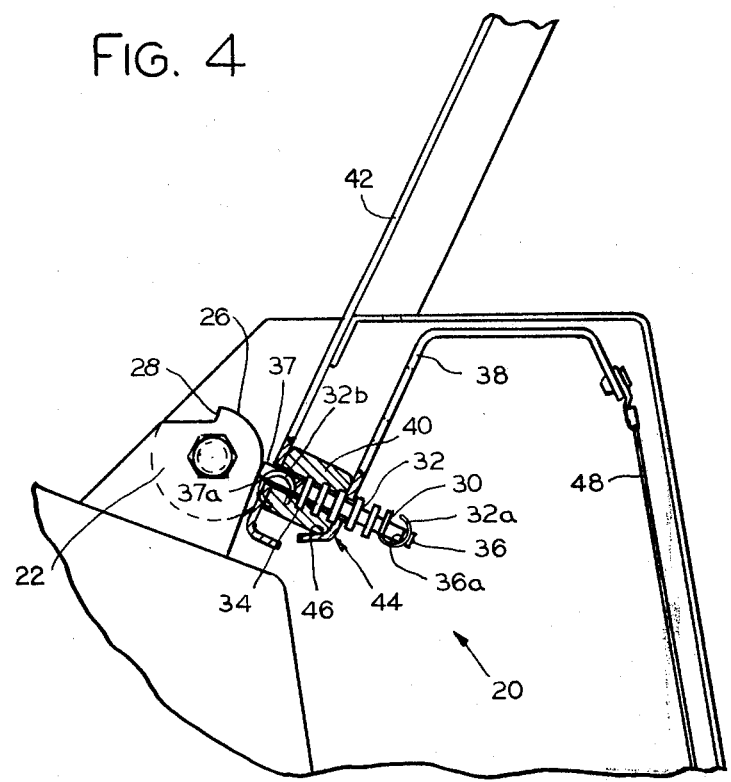
FIG. 4 is an enlarged detail view of the latch mechanism shown in FIG. 1 wherein the latch mechanism is shown with the cab enclosure in the down position.
Figure 5:
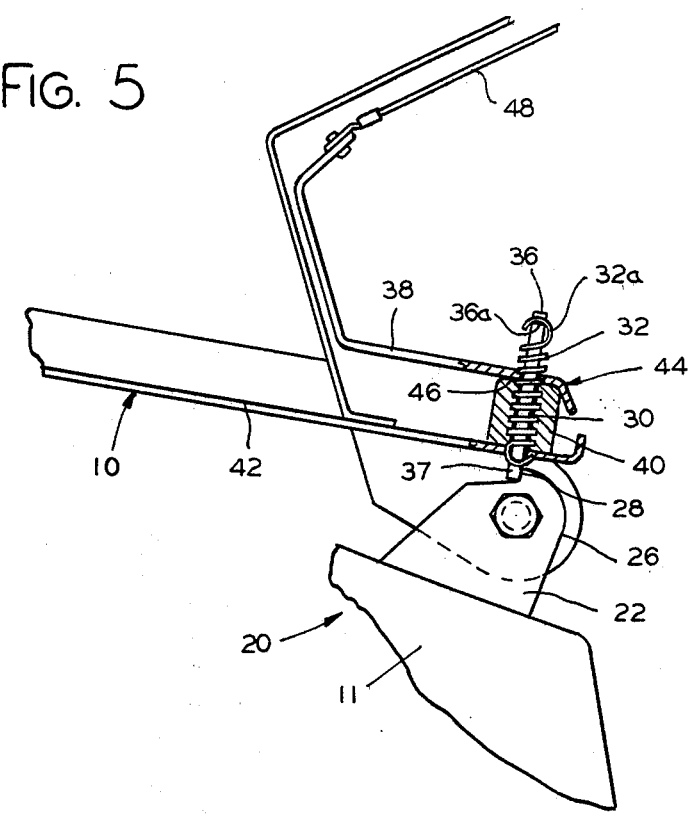
FIG. 5 is an enlarged detail view of the latch mechanism shown in FIG. 1 wherein the latch is shown with the latch plate in locked position.
Figure 6:
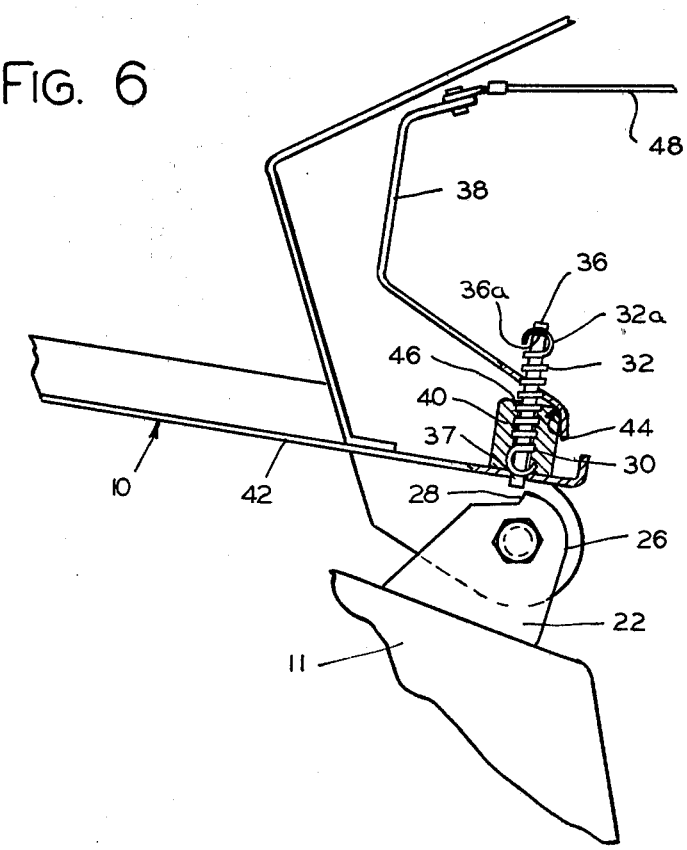
FIG. 6 is an enlarged detail view of the latch mechanism shown in FIG. 1 wherein the latch plate is in the release position when the cab enclosure is in the tilt-back position and FIG. 7 is a perspective view of the improved latch mechanism of the present invention.
Figure 7:
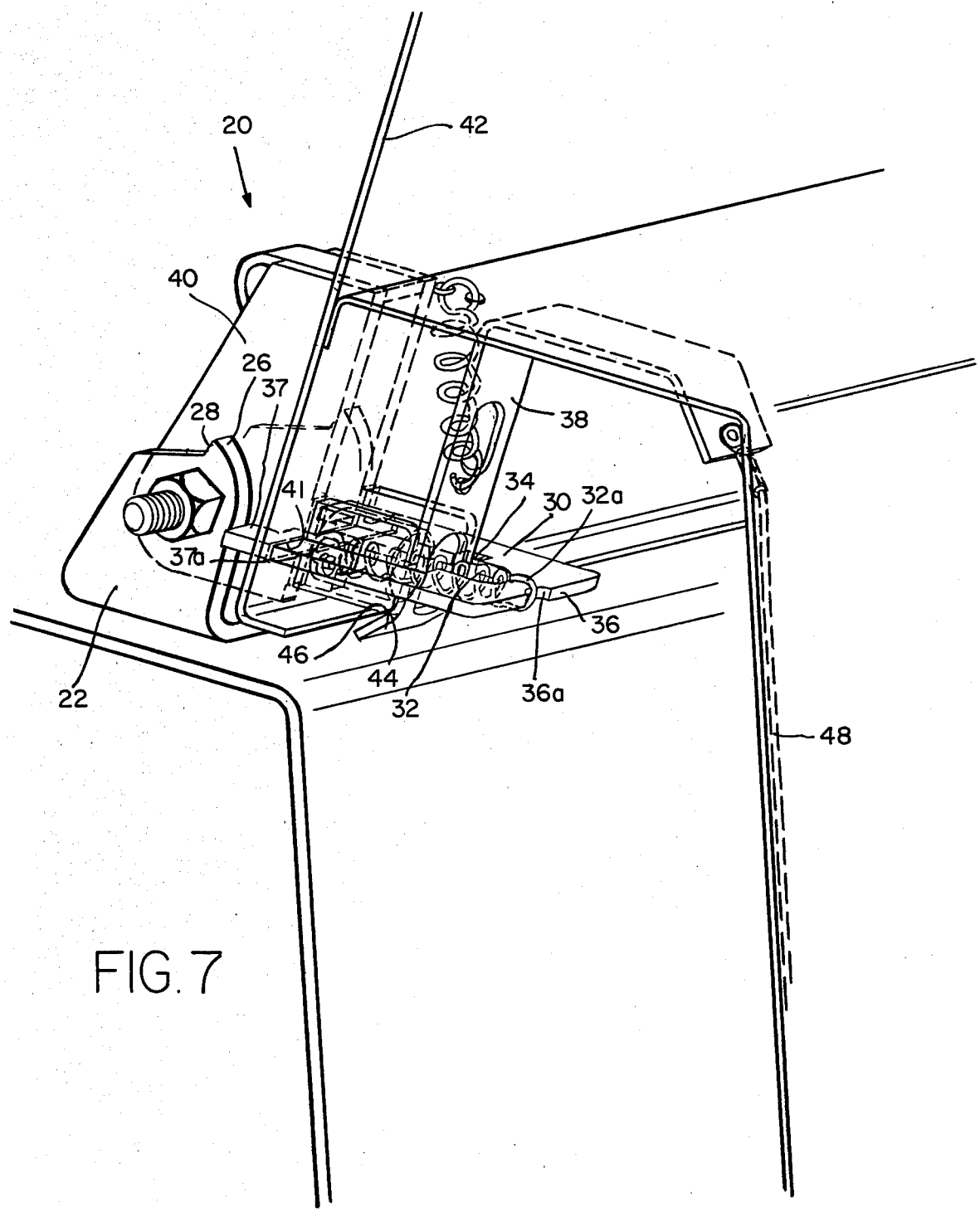

Referring now to FIGS. 4, 5 and 6 which show a sequence of operation for the latch mechanism of the present invention, please refer first to FIG. 4 in which the latch mechanism 20 includes the cam member 22 having cam surface 26 and the latch plate 30, the latch plate 30 biased against the cam surface 26 by a spring 32 disposed in a slot 34 in the latch plate 30 between an outer end 36 and an inner end 37 of the latch plate 30. A latch frame 40 has an opening 41 therein which receives the latch plate 30. The spring 32 is disposed in the slot 34 and has an upper end 32a received in an opening or notch 36a in the latch plate 30 at its upper end 36 and a lower end 32b which is received in opening 37a in the lower end 37 of plate 30. The spring extends through rear wall 42 of cab enclosure 10 to attach there to bias the latch plate 30 toward surface 26 of the cam member 22. A member 38 is pivotally mounted on an upper surface of the latch frame 40 which also abuts the rear wall 42 of the cab enclosure 10. The latch plate 30 protrudes through the rear wall 42 of the cab enclosure 10 to engage the cam surface 26 of the cam member 22. As the cab enclosure is rotated about axis 16 the latch plate 30 arcuately moves along the cam surface 26 until it slips into the notch 28 as shown in FIG. 5 wherein the cap enclosure 10 is in the tilt-back position and the latch plate 30 is in the locked position. The member 38 is an "L" shaped member which forms a lever having a fulcrum point 44 on an upper edge 46 of the member 40. The lever 38 terminates in a wire 48 which has at its outer end a handle (not shown). When the handle is pulled the lever 38 pivots about the fulcrum point 44 associated with the upper surface 46 of the member 40 to urge the latch plate 30 out of engagement with the notch 28 and against the bias of the spring 32. When the latch plate 30 is fully clear of the notch 28 the cab enclosure 10 may be pivoted forward to return it to the down position wherein it may be again bolted to the frame at front locations 14.

The foregoing description describes a particular embodiment of the present invention in detail. It should be understood that the recitation of the particular and preferred embodiment does not limit the structure of the present invention to the specific construction herein set forth. Equivalent elements may be substituted for the elements described above without changing the scope of the invention as described and defined by the claims below.

We claim:

1. An improved latch mechanism for a skid-steer loader wherein the loader includes:
   a frame structure;
   a cab enclosure or Roll Over Protective Structure (ROPS) pivotally mounted at the rear and fastened at the front of the frame structure;
   biasing means between the cab enclosure and the frame rotatably biasing the cab enclosure up and away from the frame wherein the latch mechanism comprises a cam member having an arcuate surface mounted on the frame;
   a latch member comprising an elongated plate mounted on the cab enclosure and having an end surface of the plate engaging the arcuate surface of the cam member;
   biasing means associated with the latch member biasing the edge portion of the latch plate into engagement with the arcuate surface of the cam member and retaining such latch plate in engagement with the arcuate portion of the cam member as the cab enclosure is rotated about the frame structure at the rear of the cab enclosure and a gap or notch provided in the arcuate surface of the cam member to receive the latch plate when the cab enclosure is fully rotated about the frame structure at the rear of the cab enclosure to retain the cab enclosure in a fixed position away from the frame.

2. The latch mechanism as claimed in claim 1 including release means for withdrawing the latch member from the gap or notch in the cam member to release the latch member and permit the cab enclosure to be operatively rotated toward the frame structure.

3. The invention as claimed in claim 2 wherein the release means comprises a cable attached to a pivotal member which engages the biasing means associated with the latch member, engagement of the release means biasing the latch member away from the cam enclosure structure to withdraw it from the gap or notch in the cam member to permit the cab to be rotated downwardly toward the frame structure.

4. The invention as claimed in claim 3 wherein the latch mechanism includes a member fixedly mounted against the rear end of the frame, the pivotal member comprises a lever pivotally mounted on an upper surface of the member mounted on the frame and the pivotal member moves against an upper surface of the first named member which comprises a fulcrum for the pivotal member or lever whereby the pivotal member can be moved against the first named member to urge the latch member out of its gap or notch so that the cab enclosure may be rotated forwardly with respect to the frame, the latch member sliding downwardly along an upper arcuate surface of the cam member to return to an initial position whereby the front and rear portions of the cab enclosure rest on the frame structure of the vehicle and the front portion of the cab enclosure can be fastened to the front of the frame structure of the vehicle.

* * * * *